Patented Apr. 11, 1944

2,346,416

UNITED STATES PATENT OFFICE 2,346,416

TREATMENT OF RESIN OILS

Edwin Louis Cline, Philadelphia, Pa., assignor, by mesne assignments, to Allied Chemical & Dye Corporation, a corporation of New York No Drawing. Application January 14, 1941, Serial No. 374,399

8 Claims. (Cl. 260—23)

This invention relates to resins and more particularly to an improved process for the production of resins. The invention pertains especially to the production of resins of the coumarone-indene type including commercial paracoumarone resin which may contain in addition to polymerized coumarone and indene a substantial proportion of the polymers of other resin-forming compounds such as styrene and its homologs present in coumarone- and indene-containing oils.

In the commercial production of paracoumarone resin, oil fractions such as crude solvent naphtha containing resin-forming polymerizable constituents, chiefly coumarone and indene, are treated with a suitable polymerization catalyst, usually an acid catalyst such as concentrated sulfuric acid. The acid sludge is separated from the oil, the acid remaining in the oil is neutralized with an aqueous alkaline solution such as caustic soda or soda ash solution, and the neutralized oil is then distilled to obtain refined oil as distillate and paracoumarone resin as still residue. As is well known in the paracoumarone resin art, the resin frequently darkens and develops objectionable odor during manufacture, especially during polymerization and distillation to separate the resin from the solvent medium. For many purposes, e. g. in the manufacture of varnishes, light colored resins free from objectionable odor are highly desirable and much research has been devoted to improving the quality of acid-polymerized paracoumarone resin. For example, Miller Patent No. 1,360,665 of November 30, 1920, discloses the maintenance of the temperature of the solvent naphtha below about 20° C. during polymerization to improve the color of the resin; frequently, however, the resin darkens while the resin-containing oils are being distilled notwithstanding such temperature control during polymerization.

It is an object of this invention to provide an improved process for the recovery of acid-polymerized resins of improved character from solvent oils containing such resin.

It is a further object of the invention to produce paracoumarone resin of improved color and odor. Other objects and advantages will appear hereinafter.

In accordance with the invention, resin solutions produced by polymerizing the resin-forming constituents of resin oil with an acid-type catalyst such as stannic chloride or boron trifluoride or sulfuric acid, preferably concentrated sulfuric acid, are heated in the presence of an alkali or alkaline earth metal or magnesium or zinc salt of a carboxylic acid during or prior to distillation of the resin solution to recover the resin therefrom. Preferably alkali or alkaline earth metal salts of carboxylic acids of sufficiently high molecular weight to render the salts at least slightly soluble (i. e. at least one part per ten thousand parts of resin oil) in the resin-containing oils are utilized; such salts of carboxylic acids having a molecular weight of at least sixty have been found suitable for the practice of this invention. The expression "resin oil" is used herein to refer to the oils recovered from coke oven tar and water gas tar by distillation, oils obtained in the production of coke oven and water gas, and oil distillates including drip oils obtained from oils collecting in manufactured gas distribution and storage systems, and oils obtained in the cracking and reforming of petroleum, which oils contain a varying but substantial content of unsaturated resin-forming constituents, such as coumarone and indene, polymerizable by acid catalysts, such as sulfuric acid, to produce resins.

I have found that heating resin oils containing acid-polymerized resin in the presence of alkali or alkaline earth metal or magnesium or zinc salts of carboxylic acids during or prior to distillation greatly reduces the tendency of the resin to darken and develop objectionable odors during distillation and hence markedly improves the quality and value of the resin obtained. While the reason for the improvement in the character of the resin is not fully understood, one possible explanation is that one or more compounds which are stable at the temperatures prevailing during polymerization but are unstable at the distillation temperatures are formed during polymerization and decompose during distillation to produce products which contaminate the resin and impart poor color and odor thereto. The salts of the carboxylic acids employed in accordance with the invention are believed to neutralize or otherwise obviate the objectionable characteristics of these thermal decomposition products.

The invention may be carried into effect, for example, by subjecting a resin oil such as crude solvent naphtha boiling within the range of from 135° to 210° C. or fractions from it boiling e. g. from 135° to 155° C., or from 165° to 185° C., etc., and containing from 15 to 80 per cent of resin-forming polymerizable constituents, chiefly coumarone and indene, to the action of an acid polymerization catalyst such as concentrated sulfuric acid, separating the acid sludge from the oil, neutralizing the acid remaining in the oil by washing it with an aqueous solution of soda ash or any other suitable neutralizing agent, washing the neutralized oil with water and distilling the resultant resin solution by steam or under vacuum in the presence of an alkali or alkaline earth metal or magnesium or zinc salt of a carboxylic acid to obtain refined oil as distillate and resin as still residue. The salt reagent employed may conveniently be added to the resin oil in powdered form or in alcoholic solution; if desired the carboxylic acid may be dissolved in the oil and the salt formed in situ by agitating the oil with a solution of the desired vase in a small amount of water. In some cases distillation of the resin-containing oil in the presence of the amount of reagent necessary to obtain the desired effect results in resin containing more ash, e. g. inorganic sulfates, than is desirable for some purposes. In such cases the resin-containing oil may be heated to a temperature of from 150° to 210° C. in the presence of the salt of the carboxylic acid, e. g. under refluxing conditions or in a closed vessel, and the inorganic sulfate formed separated from the oil by permitting it to settle or washing the oil with water. The resin-containing oil may then be distilled for the recovery of the resin in the customary manner. If the carboxylic acid is of volatile character it will be removed from the resin during distillation of the oil, or the acid may be removed by incorporating a small amount of alkali in the wash-water employed for removing the inorganic sulfates.

As hereinabove indicated, alkali or alkaline earth metal or magnesium or zinc salts of sufficiently high molecular weight carboxylic acids to render the salts at least slightly soluble in the resin-containing oils are the preferred reagents employed in carrying out the invention. The preferred reagents include the alkali and alkaline earth metal salts of carboxylic acids derived from vegetable and animal oils and rosin, such as the laurates, stearates and resinates of sodium, potassium, calcium and other alkali and alkaline earth metals. The corresponding zinc or magnesium salts may also be utilized. The acetates, oxalates, benzoates, phthalates and other carboxylic acid salts of alkali and alkaline earth metals and magnesium and zinc also improve the color and odor of the resin obtained. The amount of reagent necessary to obtain resin of optimum color and odor depends on many factors, such as the proportion of resin in the resin-containing oil, the extent to which the resin tends to darken and develop objectionable odor during distillation, and the particular reagent utilized. In general from 0.05 to 2.0 per cent of the reagent based on the weight of the resin-containing oil is sufficient to inhibit darkening of the resin and development of objectionable odor during distillation. The optimum amount of reagent for each batch of resin-containing oil may readily be determined prior to distillation of the batch by effecting small scale distillations of small portions of the batch with different amounts of the reagents and observing the minimum amount of reagent that produces resin of satisfactory color and odor.

The following examples are illustrative of the invention.

Example I

An oil of coke oven origin boiling at from about 160° to 200° C. and containing about 30 per cent by weight of polymerizable constituents, chiefly coumarone and indene, was polymerized using concentrated (66° Bé.) sulfuric acid as catalyst, the acid sludge was drawn off, the polymerized oil neutralized with aqueous soda ash solution and then washed with water. The resin-containing oil was then heated to 80° C. and .88 per cent by weight of powdered (100 mesh) calcium resinate was dissolved therein. The oil was then distilled to obtain paracoumarone resin as still residue and refined oil as distillate. The resin which was of about 135° C. melting point had a mild and pleasant odor and a color of C–1 as measured on the customary resin scale of color described more fully hereinbelow.

Example II

An oil of coke oven origin boiling at from about 160° to 200° C. and containing about 30 per cent by weight of polymerizable constituents, chiefly coumarone and indene, was polymerized using concentrated sulfuric acid as catalyst, the acid sludge was drawn off, the polymerized oil neutralized with aqueous soda ash solution and then washed with water. The resin-containing oil was then heated to 80° C. and .6 per cent by weight of calcium laurate, based on the weight of the oil was dissolved therein. The oil was then distilled to obtain paracoumarone resin as still residue and refined oil as distillate. The resin was of about 135° C. melting point, had a mild and pleasant odor and a color of C–1 as measured on the customary resin color scale.

Example III

An oil of coke oven origin boiling at from about 160° to 200° C. and containing about 30 per cent by weight of polymerizable constituents, chiefly coumarone and indene, was polymerized with concentrated sulfuric acid catalyst, the acid sludge was drawn off, the polymerized oil neutralized with aqueous soda ash solution and then washed with water. The resin-containing oil was then refluxed for six hours at a temperature of 170° C. with .6 per cent by weight of calcium laurate based on the weight of the oil and washed with water. The oil was then distilled and yielded as still residue paracoumarone resin of a melting point of about 135° C. having a mild and pleasant odor and a color of C–2.

The invention results in marked improvement in the character of resins recovered from oils containing resins that tend to develop objectionable odor and dark color during distillation. Resin color is usually designated by a color number on the customary resin scale. This scale is determined by preparing three stock solutions, namely, stock solution "A" constituted of 40 cc. of 33.5 per cent hydrochloric acid and 1560 cc. of water; stock solution "B" made by triturating 450 grams of C. P. ferric chloride ($FeCl_3.6H_2O$), 270 cc. of solution "A" and filtering, using the clear filtrate for stock solution "B;" and stock solution "C" made by triturating 60 grams of C. P. cobalt chloride ($CoCl_2.6H_2O$) and 60 cc. of solution "A" and filtering, using the filtrate for stock solution "C," and mixing these stock solutions in various proportions to form standard color mixtures corresponding to the respective color numbers. The solutions should be well mixed and about 25–28 cc. of each of the mixtures placed in a 1 oz. test bottle, each bottle labeled with its color number and the bottle sealed with sealing wax to prevent evaporation of water and hydrochloric acid. The proportions of the stock solutions employed in the mixtures corresponding to representative color numbers are given in the following table:

| Color number | Volumes in cubic centimeters | | | |
| --- | --- | --- | --- | --- |
| | A | B | C | Water |
| C–½ | 125 | 0.5 | 0.50 | |
| C–1 | 125 | 1.0 | 0.75 | |
| C–1½ | 125 | 1.4 | 0.95 | |
| C–2 | 125 | 2.0 | 1.25 | |
| C–2½ | 125 | 2.8 | 1.60 | |
| C–3 | 125 | 4.0 | 2.00 | |
| C–3½ | 15 | 6.0 | 2.00 | 110 |
| C–4 | 15 | 8.0 | 2.00 | 110 |
| C–5 | 15 | 10.0 | 2.75 | 85 |
| C–6 | 10 | 20.0 | 5.00 | 90 |
| C–7 | | 40.0 | 7.50 | 100 |
| C–8 | | 65.0 | 5.00 | 50 |
| C–9 | | 125.0 | 10.00 | 27.5 |
| C–10 | | 125.0 | 10.00 | |

To determine the color of a resin a two-gram sample thereof is dissolved in 25 cc. of benzol and the depth of the color of the resin solution thus produced is compared with the standard colors. If the sample lies between two consecutive numbers, its color is reported as the higher one. For purposes of comparison there are given below (A) the color numbers of the resins produced in accordance with Examples I, II and III, and (B) the color numbers of resins recovered in the usual manner from portions of the oils utilized in the respective examples, i. e. by distilling the oils without treatment with a salt of a carboxylic acid:

| | I | II | III |
| --- | --- | --- | --- |
| A. Resin of Example: Color number | C–1 | C–1 | C–2 |
| B. Resin obtained from oil of examples without treatment with salt of carboxylic acid: Color number | C–10 | C–10 | C–10 |

Thus it will be seen the invention renders possible the recovery of light colored resins of pleasant odor from oils containing resins which heretofore darkened objectionably and developed unpleasant odors during distillation of the oils. Since light colored resin of mild odor is necessary for many purposes and hence is of greater value than resin of dark color or unpleasant odor, the invention represents a substantial advance in the commercial production of acid-polymerized resins.

Since certain changes may be made in the above without departing from the scope of the invention, it is intended that all matter contained in the above description shall be interpreted as illustrative and not in a limiting sense.

What is claimed is:

1. In a process for the production of resin involving subjecting oil containing at least one polymerizable resin-forming constituent of the group consisting of coumarone and indene to the action of sulfuric acid polymerization catalyst, neutralizing the oil and distilling the oil to recover the resin therefrom, the improvement which comprises heating said oil after said polymerization is effected in the presence of a salt of an organic carboxylic acid and a metal selected from the group consisting of alkali metals, alkaline earth metals, magnesium and zinc.

2. A process for the production of acid-polymerized resin of improved character which comprises polymerizing the polymerizable material present in resin oil containing at least one polymerizable material selected from the group consisting of coumarone and indene with concentrated sulfuric acid polymerization catalyst, neutralizing the oil and distilling the resin-containing oil in the presence of a salt of an organic carboxylic acid and a metal selected from the group consisting of alkali metals, alkaline earth metals, magnesium and zinc.

3. A process for the production of acid-polymerized resin of improved character which comprises polymerizing polymerizable materials present in resin oil containing at least one polymerizable constituent selected from the group consisting of coumarone and indene with sulfuric acid polymerization catalyst, heating the resin-containing oil in the presence of a salt of an organic carboxylic acid and a metal selected from the group consisting of alkali metals, alkaline earth metals, magnesium and zinc.

4. In a process of treating oil containing resin produced by polymerizing by acid-type catalyst at least one polymerizable constituent selected from the group consisting of coumarone and indene, which resin tends to deteriorate during recovery from the resin-containing oil, the improvement which comprises heating the resin-containing oil in the presence of a salt of an organic carboxylic acid and a metal of the group consisting of alkali metals, alkaline earth metals, magnesium and zinc.

5. A process which comprises treating with an acid-type polymerization catalyst oil containing at least one polymerizable resin-forming material selected from the group consisting of coumarone and indene, neutralizing the resultant resin-containing oil, and heating the oil in the presence of a salt of an organic carboxylic acid and a metal selected from the group consisting of alkali metals, alkaline earth metals, magnesium and zinc.

6. In a process for the production of paracoumarone resin involving subjecting oil containing paracoumarone resin-forming constituents to the action of concentrated sulfuric acid polymerization catalyst to polymerize said constituents, neutralizing the resin-containing oil, and distilling the resin-containing oil to recover the resin therefrom, the improvement which comprises heating said oil after neutralization thereof in the presence of an alkaline earth metal salt of an organic carboxylic acid of sufficient molecular weight to render the salt at least slightly soluble in said oil.

7. In a process for the production of paracoumarone resin involving subjecting oil containing paracoumarone resin-forming constituents to the action of concentrated sulfuric acid polymerization catalyst to polymerize said constituents, neutralizing the resin-containing oil, and distilling the resin-containing oil to recover the resin therefrom, the improvement which comprises heating said oil after neutralization thereof in the presence of an alkali metal salt of an organic carboxylic acid of sufficient molecular weight to render the salt at least slightly soluble in said oil.

8. In a process for the production of paracoumarone resin involving subjecting oil containing paracoumarone resin-forming constituents to the action of concentrated sulfuric acid polymerization catalyst to polymerize said constituents, neutralizing the oil, and distilling the resin-containing oil to recover the resin therefrom, the improvement which comprises heating said oil after neutralization thereof in the presence of a magnesium salt of an organic carboxylic acid of sufficient molecular weight to render the salt at least slightly soluble in said oil.

EDWIN LOUIS CLINE.